(12) United States Patent
Innocenti et al.

(10) Patent No.: US 11,319,988 B2
(45) Date of Patent: May 3, 2022

(54) TILTING-PAD BEARING AND METHOD OF MANUFACTURING THEREOF

(71) Applicant: Nuovo Pignone Tecnologie - S.r.l., Florence (IT)

(72) Inventors: Alice Innocenti, Florence (IT); Lorenzo Naldi, Florence (IT)

(73) Assignee: Nuovo Pignone Tecnologie Srl, Florence (IT)

( * ) Notice: Subject to any disclaimer, the term of this patent is extended or adjusted under 35 U.S.C. 154(b) by 0 days.

(21) Appl. No.: 16/345,282

(22) PCT Filed: Oct. 24, 2017

(86) PCT No.: PCT/EP2017/077180
§ 371 (c)(1),
(2) Date: Apr. 26, 2019

(87) PCT Pub. No.: WO2018/077884
PCT Pub. Date: May 3, 2018

(65) Prior Publication Data
US 2019/0293115 A1   Sep. 26, 2019

(30) Foreign Application Priority Data
Oct. 27, 2016   (IT) .................. 102016000108934

(51) Int. Cl.
*F16C 17/03*   (2006.01)
*F16C 17/06*   (2006.01)
(Continued)

(52) U.S. Cl.
CPC .......... *F16C 17/035* (2013.01); *F16C 17/065* (2013.01); *F16C 32/0648* (2013.01);
(Continued)

(58) Field of Classification Search
CPC .. F16C 17/035; F16C 17/065; F16C 32/0655; F16C 33/108; F16C 33/1085
See application file for complete search history.

(56) References Cited

U.S. PATENT DOCUMENTS 5,284,392 A * 2/1994 Ide .................. F01D 25/166
                                                    384/117
5,360,273 A * 11/1994 Buckmann ............. F01D 25/22
                                                    384/117
(Continued)

FOREIGN PATENT DOCUMENTS

DE   19627288 A1 * 1/1997  ............ F16C 17/035
JP      58134221 A * 8/1983  .......... F16C 33/1085
(Continued)

*Primary Examiner* — Phillip A Johnson
(74) *Attorney, Agent, or Firm* — Baker Hughes Patent Organization

(57) ABSTRACT

According to one aspect of the present disclosure, a bearing (100) for supporting a shaft (200) rotating around an axis A is provided. The bearing (100) comprises: a bearing housing (120); and a plurality of tilting pads (130), wherein each tilting pad is connected to the housing (120) via a flexible web support (135) and comprises a bearing surface (136) directed toward a shaft receiving space (125) configured for supporting a shaft. The bearing surface (136) of at least one tilting pad (130) of the plurality of tilting pads is provided with a plurality of lubricant feed openings (140). According to a further aspect, a method of operating a bearing (100) as well as a method of manufacturing a bearing (100) are provided.

15 Claims, 6 Drawing Sheets

(51) Int. Cl.
*F16C 33/10* (2006.01)
*F16C 32/06* (2006.01)

(52) U.S. Cl.
CPC ........ *F16C 32/0655* (2013.01); *F16C 33/108* (2013.01); *F16C 33/1085* (2013.01)

(56) References Cited

U.S. PATENT DOCUMENTS

| | | | | |
|---|---|---|---|---|
| 5,772,334 | A | * | 6/1998 | Parkins ................. F16C 17/035 384/117 |
| 5,938,344 | A | * | 8/1999 | Sabin .................... F16C 17/035 384/125 |
| 2014/0248008 | A1 | | 9/2014 | Brahm |
| 2015/0104123 | A1 | | 4/2015 | Ertas |
| 2018/0077884 | A1 | | 3/2018 | Barker |

FOREIGN PATENT DOCUMENTS

| | | | | |
|---|---|---|---|---|
| JP | 2010112486 | A | 5/2010 | |
| PL | 168027 | B1 * | 12/1995 | ............ F16C 17/035 |
| RU | 1291744 | A1 | 2/1987 | |

\* cited by examiner

TILTING-PAD BEARING AND METHOD OF MANUFACTURING THEREOF

TECHNICAL FIELD

The present disclosure relates to a bearing for supporting a shaft rotating around an axis. More specifically, the present disclosure relates to a radial or axial bearing with a plurality of tilting pads respectively connected to a bearing housing via a flexible web support. The present disclosure further relates to a method of operating a bearing as well as to a method of manufacturing a bearing.

BACKGROUND

In fluid bearings, a rotary shaft is typically supported on a thin layer of liquid or gas that acts between a bearing surface of the fluid bearing and a shaft journal. Fluid bearings can be broadly classified in hydrodynamic bearings and hydrostatic bearings. In hydrostatic bearings, a highly pressurized fluid such as oil may prevent a direct contact between the shaft surface and the bearing surface. In hydrodynamic bearings, the journal moves at a high speed with respect to the bearing surface such as to pressurize the fluid in a lubricating wedge between the shaft journal and the bearing surface. The lubricating wedge forms around the rotating shaft, and hydrodynamic lubrication is obtained when the bearing surface and the mating shaft surface are completely separated by a cohesive film of lubricant therebetween.

Whereas hydrostatic bearings typically rely on an external pump for pressurizing the fluid at a static pressure, the pressure in hydrodynamic bearings may be maintained by the rotation of the shaft. Hydrodynamic bearings may have high friction at low speed, before the wedge is formed, and may therefore be used for high-speed applications where starts and stops of the shaft are not frequent. The bearing may then be continuously operated in a hydrodynamic lubrication mode.

Tilting pad bearings exist both as hydrostatic bearings and as hydrodynamic bearings. Further, tilting pad bearings exist both as radial or journal bearings as well as axial or thrust bearings. Radial or journal bearings include tilting pads spaced around an axis of the shaft. The tilting pads may be connected to a bearing housing such as to be tiltable with respect to a respective tilting axis which may extend parallel to the axis of the shaft. The bearing surfaces of the tilting pads may be directed toward a shaft housing space where the shaft is to be supported. In operation, the rotating shaft may carry the lubricant to the bearing surfaces of the tilting pads through viscous drag. The pressure of the lubricant between the bearing surface and the shaft may lead to a slight tilt of the tilting pads with respect to the tilting axis of the pads, and a wedge of pressurized lubricant may form between the shaft and the bearing surface. The tilt of the pads may change depending on the bearing load and speed.

However, in a tilting-pad bearing, obtaining a uniform supply of lubricant between the bearing surfaces and the shaft journal during operation may be difficult. An inhomogeneous distribution of lubricant across the bearing surfaces may lead to instabilities at high operational speeds as well as to excessive heat generated in particular areas of the bearing surfaces.

Accordingly, it would be beneficial to design and provide a tilting-pad bearing as well as a method of manufacturing thereof that allows for high operational speeds without the risk of overheating and instabilities.

SUMMARY

In light of the above, a bearing for supporting a shaft rotating around an axis is provided. The bearing includes: a bearing housing; and a plurality of tilting pads, wherein each tilting pad is connected to the bearing housing via a flexible web support and includes a bearing surface directed toward a shaft receiving space. The bearing surface of at least one tilting pad of the plurality of tilting pads comprises a plurality of lubricant feed openings.

Each lubricant feed opening may be configured to feed a lubricant directly onto the bearing surface into the gap between the bearing surface and the rotating shaft where a hydrodynamic wedge may be formed during operation of the bearing.

In some embodiments, the bearing may include two, three, four, five or more tilting pads, wherein the bearing surface of each of the tilting pads may comprise a plurality of lubricant feed openings, e.g. four or more lubricant feed openings, for supplying a lubricant into the gap between the respective bearing surface and the shaft. The lubricant feed openings may be arranged spaced-apart from each other in the bearing surfaces.

In some embodiments, the bearing may be a radial bearing or journal bearing, in which the bearing housing surrounds the shaft receiving space in a circumferential direction. In some embodiments, the bearing may be an axial or thrust bearing, in which the plurality of tilting pads are connected to a radial or axial surface of the bearing housing respectively.

In some embodiments, the bearing is a monolithic bearing, in which the tilting pads are integrally formed with the bearing housing.

According to a further aspect of the present disclosure, a rotary mechanical device is provided. The rotary mechanical device may be a high-speed rotary mechanical device, particularly at least one of a compressor and a turbine, more particularly a steam turbine or a gas turbine. The rotary mechanical device includes a shaft and a bearing. The bearing includes a bearing housing and a plurality of tilting pads, wherein each tilting pad is connected to the bearing housing via a flexible web support and includes a bearing surface directed toward the shaft. A bearing surface of at least one tilting pad of the plurality of tilting pads comprises a plurality of lubricant feed openings. The shaft is rotatably supported in a shaft receiving space of the bearing.

According to a further aspect, a method of operating a bearing is provided, wherein a shaft is rotatably supported in a shaft receiving space of the bearing. The bearing includes a bearing housing; and a plurality of tilting pads, wherein each tilting pad is connected to the bearing housing via a flexible web support and includes a bearing surface directed toward a shaft receiving space. A bearing surface of at least one tilting pad of the plurality of tilting pads comprises a plurality of lubricant feed openings. The method includes rotating the shaft, while supplying a lubricant through the plurality of lubricant feed openings such as to provide a hydrodynamic lubrication wedge between the bearing surface and a shaft surface. In some embodiments, the lubricant may be fed at a pressure from 1.1 bar to 5 bar absolute.

According to a further aspect, a method of manufacturing a bearing for supporting a shaft rotating around an axis is provided. The bearing includes a plurality of tilting pads, wherein each tilting pad is connected to the bearing housing via a flexible web support and includes a bearing surface. The method comprises manufacturing at least one tilting pad of the plurality of tilting pads with a plurality of lubricant feed openings in the bearing surface by additive manufacturing, particularly by selective laser melting or laser sintering.

In some embodiments, the plurality of tilting pads is integrally manufactured with the bearing housing by additive manufacturing, particularly by selective laser melting.

In some embodiments, a channel system for guiding a lubricant toward the respective bearing surface is formed in each of the plurality of tilting pads.

Further aspects, advantages, and features of the present disclosure are apparent from the dependent claims, the description, and the accompanying drawings.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following. Some embodiments are depicted in the drawings and are detailed in the description which follows.

DETAILED DESCRIPTION

Reference will now be made in detail to the various embodiments of the disclosure, one or more examples of which are illustrated in the figures. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to corresponding or to similar components. Generally, only the differences with respect to the individual embodiments are described. Unless specified otherwise, the description of a part or aspect in one embodiment applies to a corresponding part or aspect in another embodiment as well.

Figure 1:
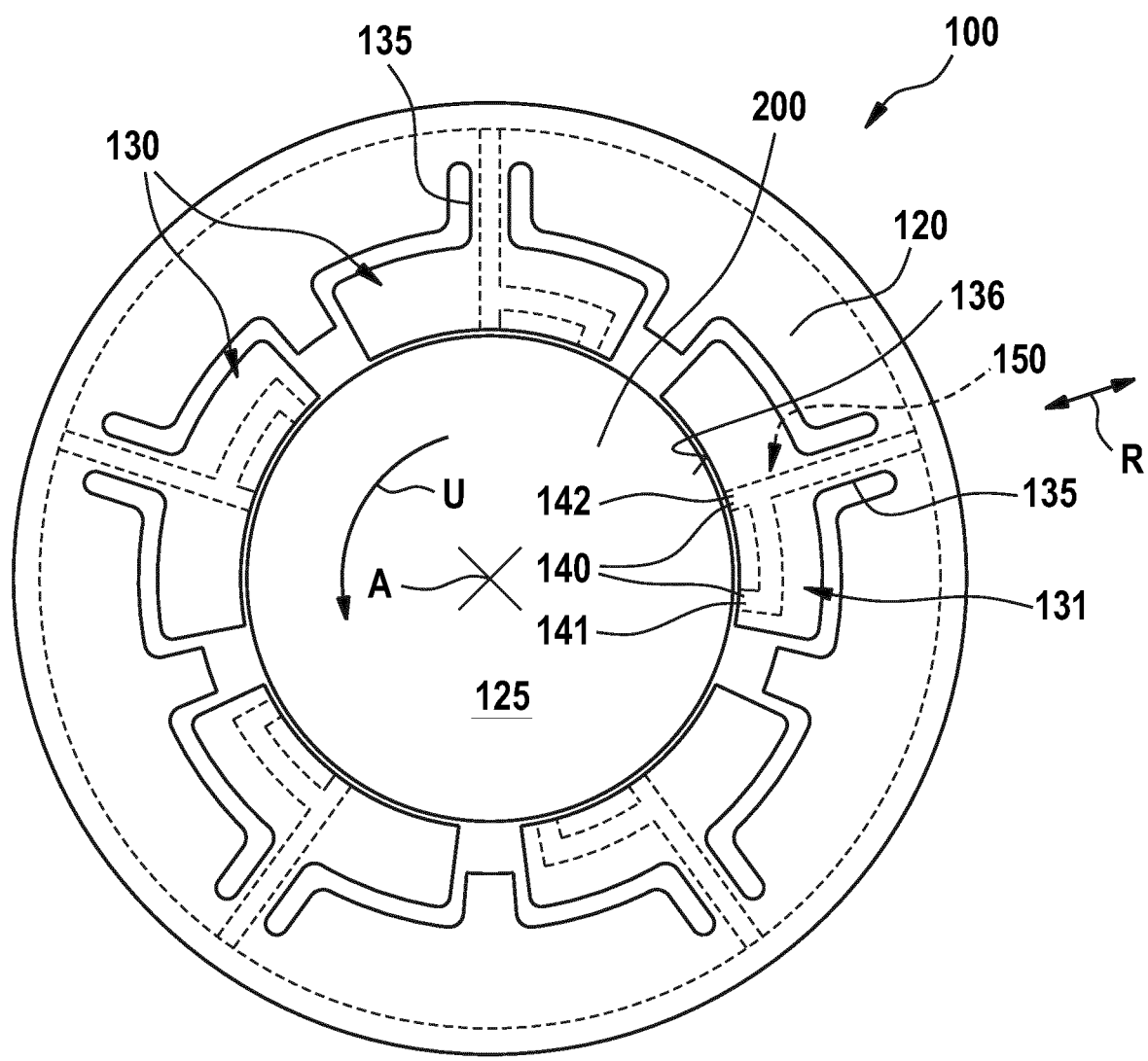
FIG. 1 is a schematic sectional view of a bearing according to embodiments described herein.

FIG. 1 is a schematic sectional view of a bearing 100 configured for supporting a shaft 200 rotating around an axis A. The sectional plane of FIG. 1 is perpendicular to the axial direction of the shaft 200. The bearing may be configured as a radial bearing or a journal bearing which is adapted to take up radial loads of the shaft.

In other embodiments, the bearing may be configured as an axial bearing or a thrust bearing which is adapted to take up axial loads of the shaft.

In some embodiments, the bearing may be configured as a combined axial and radial bearing which is adapted to take up both axial loads and radial loads of the shaft.

The bearing 100 includes a bearing housing 120. In the case of a radial bearing, the bearing housing 120 surrounds a shaft receiving space 125 in a circumferential direction U. Further, the bearing 100 includes a plurality of tilting pads 130, wherein each tilting pad is connected to the bearing housing 120 via a flexible web support and includes a bearing surface 136 directed toward the shaft receiving space 125.

During operation of the bearing 100, a shaft may be rotatably mounted in the shaft receiving space 125 such as to be surrounded by the bearing housing 120 in the circumferential direction U. The bearing surfaces of the tilting pads may be shaped to mate with the outer surface of the shaft 200, i.e. with the shaft journal, such that a hydrodynamic lubrication wedge may form in a radial gap between the bearing surfaces 136 and the shaft journal. The lubrication wedge may lift the shaft from the pad surfaces at a rotation speed exceeding a threshold value. The shaft may rotate without directly contacting the bearing surfaces 136 due to the lubrication wedge acting therebetween.

A "bearing surface" as used herein may be understood as the surface of a tilting pad, on which, during operation of the bearing, a lubricant film such as the hydrodynamic lubrication wedge may form. In the case of a radial bearing, the bearing surface may be a curved inner radial surface of the tilting pad. In the case of a thrust bearing, the bearing surface may be an essentially flat front surface of the tilting pad. In an idle state of the bearing, the shaft may be in direct contact with the bearing surfaces of the tilting pads. In an operating state of the bearing, the shaft may slide over the bearing surfaces, wherein a lubricant may be provided as a thin fluid film between the bearing surfaces and the shaft.

A "flexible web support" as used herein may be understood as a thin and elastically bendable material connection between a tilting pad and the pivot housing. In the case of a radial bearing, the flexible web supports may essentially extend in a radial direction and may have a minimum width in the circumferential direction which allows a pivot action of the respective tilting pad. The width of the flexible web supports may depend on the bearing/shaft diameter. In the case of a thrust bearing, the flexible web supports may be connected to a radial surface of the bearing housing and may extend in an axial direction between the bearing housing and the respective tilting pad. The bearing housing may have an annular shape surrounding the axis A in some embodiments.

It is noted that, in the following description, radial bearings will be mainly described. However, as will be apparent to the skilled person, the bearings of some embodiments described herein may likewise be configured as thrust bearings. In the case of a thrust bearing, the plurality of tilting pads may be connected to the bearing housing. A radial surface of the shaft, e.g. a front surface of the shaft or a radial step provided at the shaft may be rotatably supported on the bearing surfaces of the plurality of tilting pads. The features of the present description may also be implemented in the case of a thrust bearing. In particular, a plurality of lubricant feed openings may be provided in the bearing surface of at least one tilting pad of the thrust bearing, particularly of all of the tilting pads.

The plurality of tilting pads 130 of the radial bearing which is depicted in FIG. 1 may be adapted to be tiltable or pivotable around a respective tilting axis, wherein the tilting axes of the tilting pads may extend parallel to the axis A of the shaft 200. In particular, the flexible web support 135 which connects a tilting pad to the bearing housing may be bendable or elastically deformable in the circumferential direction U such that the tilting pad can be pivoted with respect to a respective tilting axis.

Accordingly, the tilting pads can follow a movement of the shaft relative to the bearing housing caused by the variable pressure of the lubrication wedge during operation of the bearing.

In accordance with embodiments described herein, the bearing surface 136 of at least one tilting pad 131 includes a plurality of lubricant feed openings 140. For example, the at least one tilting pad 131 of FIG. 1 includes a first opening 141 and a second opening 142 in the bearing surface 136 in the illustrated sectional plane. In some embodiments, more than two spaced-apart lubrication feed openings may be provided in the bearing surface of the at least one tilting pad 131. The plurality of lubricant feed openings 140 may be configured for feeding lubricant from the interior of the at least one tilting pad 131 into the fluid film provided in the gap between the bearing surface 136 and an outer surface of the shaft 200. In other words, the plurality of lubricant feed openings 140 may be configured for feeding lubricant into the shaft receiving space 125.

By feeding lubricant onto the bearing surface through a plurality of openings which are provided in the bearing surface of the at least one tilting pad, a more uniform and more continuous distribution of lubricant between the tilting pad and the shaft can be achieved during operation of the bearing. Further, the amount of lubricant can be locally controlled across the surface area of the bearing surface such as to obtain an improved formation of a lubrication wedge. For example, the distribution of the lubrication feed openings and/or the opening size of the lubrication feed openings may be configured such that rotation instabilities can be reduced.

Further, by introducing the lubricant directly into the fluid film on the bearing surface at two or more spaced-apart positions, a carry-over of hot lubricant from a first tilting pad to an adjacent tilting pad can be reduced and the temperature of the bearing material can be decreased.

Whereas for a purely hydrostatic application a single lubricant feed opening for feeding a lubricant at a high pressure into the shaft receiving space may be sufficient, providing the lubricant through a plurality of lubricant feed openings 140 in each tilting pad may provide particular advantages for a hydrodynamic bearing. This is because, in a hydrodynamic bearing, a locally defined lubricant feed directly into the fluid film may help to reduce instabilities of the lubrication wedge. By providing the bearing surface 136 of the at least one tilting pad 131 with a plurality of spaced-apart lubrication feed openings configured for feeding the lubricant directly into the fluid film, the stability of wedge formation can be improved and instabilities of the rotating shaft can be minimized.

In some embodiments, which may be combined with other embodiments described herein, the bearing 100 may be configured as a hydrodynamic bearing.

In some embodiments, at least one or more openings of the plurality of lubricant feed openings can be used to provide hydrostatic or active lubrication capabilities, e.g. by providing a lubricant supply configured for feeding the lubricant at a high lubricant pressure. For example, a device for pressurizing the lubricant may be provided to generate a sufficient load support, in order to equip the hydrodynamic bearing with hydrostatic capabilities.

In some embodiments, at least one or more lubricant feed openings provided in the bearing surface 136 may be configured for feeding the lubricant at a second lubricant pressure, and the remaining lubricant feed openings may be provided for feeding the lubricant at a first lubricant pressure. The first pressure may be lower than the second pressure. Accordingly, the bearing may provide hydrodynamic and/or hydrostatic bearing properties. For example, two separate channel systems may be provided in the at least one tilting pad, wherein a first channel system may be configured for feeding a subset of the plurality of lubricant feed openings with lubricant at the first pressure, and a second channel system may be configured for feeding a second subset of the plurality of lubricant feed openings with lubricant at the second pressure. The bearing may be operated in the hydrodynamic regime and/or with hydrostatic/active lubrication.

The dynamic behaviour of the bearing 100 can be further improved by providing the bearing surfaces of each of the plurality of tilting pads 130 with a plurality of spaced-apart lubrication feed openings configured for feeding a lubricant into the gap between the respective bearing surface and an outer surface of the shaft. For example, two, three, four or more lubricant feed openings may be provided in the bearing surface of each tilting pad.

The bearing shown in FIG. 1 includes a total of five tilting pads which are evenly distributed in the circumferential direction U around the shaft receiving space 125. In other words, the five tilting pads are arranged at equally spaced angular positions with respect to the axis A. For example, in the case of five tilting pads, the angular distance between the angular centers of two adjacent tilting pads may be 360°/5=72°.

In other embodiments, the bearing may include less or more than five tilting pads, e.g. two, three, or four tilting pads or six or more tilting pads. The tilting pads may be arranged at equally spaced angular positions with respect to the axis A.

In some embodiments, the shape of each tilting pad of the plurality of tilting pads 130 may be essentially the same. A plurality of lubrication feed openings may be provided in a corresponding pattern in the bearing surface of each of the plurality of tilting pads.

The tilting pads may be configured essentially symmetrically with respect to a respective symmetry axis which may extend in the radial direction R along the respective tiltable web support through a center of the respective tilting pad. In other words, the shape of a leading circumferential portion of each tilting pad may be essentially a mirror image of the shape of a trailing circumferential portion of the tilting pad. If the tilting pads have a symmetrical setup with respect to a symmetry plane, the bearing may be utilized to support a shaft rotating both in a clockwise and in a counter-clockwise direction.

In some embodiments, the plurality of lubricant feed openings 140 may be arranged in a pattern in the bearing surface 136, wherein the pattern may not be symmetrical with respect to the symmetry plane of the respective tilting pad. For example, more openings may be provided in a leading circumferential portion of the bearing surface than in the trailing circumferential portion of the bearing surface.

For example, in the embodiment shown in FIG. 1, the plurality of lubricant feed openings 140 is provided in a pattern that is asymmetrical with respect to the symmetry plane of the at least one tilting pad 131. An asymmetric setup of the lubricant feed openings may help to suppress dynamic instabilities of the bearing.

In some embodiments, the bearing may be configured for high-speed applications. For example, the bearing may be configured for supporting a shaft rotating at a peripheral speed of 60 m/s or more, particularly 80 m/s or more, more particularly 100 m/s or more, or even 120 m/s or more. The term "peripheral speed" as used herein may be understood as the maximum relative speed between the supported surface of the shaft and the bearing surface of a tilting pad during operation of the bearing.

The bearing may be provided with a channel system 150 which extends through the interior of the at least one tilting pad 131 in order to guide the lubricant toward the plurality of lubricant feed openings 140. In some embodiments, the channel system 150 may extend through the interior of the at least one tilting pad 131 and through the flexible web support 135 of the at least one tilting pad in order to guide the lubricant from the bearing housing 120 through the flexible web support 135 into the at least one tilting pad 131. The plurality of lubricant feed openings 140 may be in fluid communication with the channel system 150.

In some embodiments, each tilting pad is supported on a single thin flexible web support. The geometry and topology of the tilting pads as well as of the flexible web supports may be designed such as to obtain an improved dynamic behavior of the bearing also at high rotational speeds. The dynamic behavior of the bearing may depend on numerous parameters such as the weight of the tilting pads, the inertia of the tilting pads with respect to the respective tilting axis, the radial stiffness of the flexible web supports and/or the rotational stiffness of the flexible web supports. The radial and rotational stiffness of a flexible web support may depend on the material properties, on the thickness of the flexible web support in the circumferential direction as well as on the radial length of the flexible web support. It may be beneficial to provide a flexible web support with a high radial stiffness and a low rotational stiffness. Further, it may be beneficial to provide a tilting pad with a low weight which may have a reduced inertia with respect to the tilting axis of the tilting pad.

In some embodiments, the geometry of the tilting pads is designed by applying an optimization process to the analytical expressions of the design variables (i) radial stiffness of the flexible web support, (ii) rotational stiffness of the flexible web support, and (iii) inertia of the tilting pad. Further, in some embodiments, different weight factors and constraints may be assigned to the design variables obtained according to rotordynamics sensitivity analysis results.

In some embodiments, which may be combined with other embodiments described herein, the bearing may be a monolithic bearing. In a monolithic bearing, the plurality of tilting pads 130 is integrally formed with the bearing housing 120. Therein, each tilting pad of the plurality of tilting pads may be integrally formed with the respective flexible web support and with the bearing housing. In other words, the tilting pads, the flexible web supports and the bearing housing may be manufactured from a single material piece, without any material-to-material bond or any form-fit or force-fit connection. For example, the bearing may be manufactured as a "one-piece" bearing, particularly via additive manufacturing techniques. When a ratio between the thickness of the flexible web supports in the circumferential direction and a length of the flexible web supports in the radial direction is low enough, a tilting movement of the tilting pads around a respective tilting axis becomes possible.

The wear resistance and life expectancy of a monolithic bearing is improved as compared to a multi-piece bearing which has the tilting pads connected to the bearing housing via a material-to-material connection or via a form-fit or force-fit connection.

It is to be noted that the bearing housing of a monolithic bearing as used herein is not necessarily a "one-piece" housing. For example, the bearing housing can include two half-shells that can be mounted around a shaft journal. However, also in this case, each tilting pad is integrally formed with one of the housing parts.

The bearing depicted in FIG. 1 is a monolithic bearing, wherein the bearing housing 120, the plurality of tilting pads 130 as well as the flexible web supports 135 are formed as a single material piece, e.g. as an integrally formed metal piece.

In some embodiments, the bearing is made of a metal, particularly of a nickel-based alloy, more particularly a nickel-chromium based superalloy, e.g. an Inconel alloy such as Inconel718.

Figure 2:
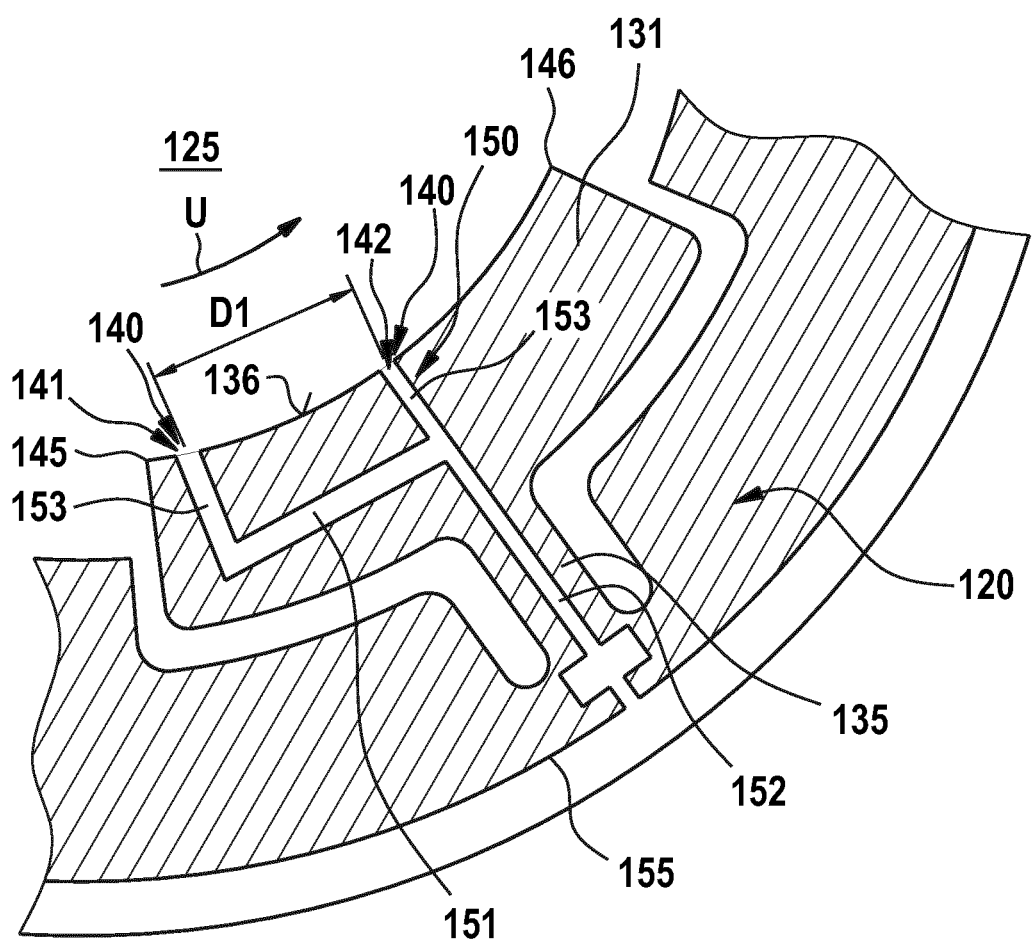
FIG. 2 is an enlarged sectional view of one of the tilting pads of the bearing of FIG. 1.

FIG. 2 is an enlarged sectional view of the at least one tilting pad 131 of the bearing 100 of FIG. 1. In some embodiments, the remaining tilting pads of the plurality of tilting pads 130 of the bearing may be correspondingly shaped.

The tilting pad 131 may be integrally formed with the flexible web support 135 and with the bearing housing 120. Further, the tilting pad 131 includes a bearing surface 136 which is directed toward the shaft receiving space 125. A plurality of lubricant feed openings 140 is provided in the bearing surface for feeding lubricant directly into the fluid film to be provided on the bearing surface 136.

In some embodiments, two or more openings of the plurality of lubricant feed openings 140 are spaced-apart in the circumferential direction U. For example, a first opening 141 may be provided in a leading circumferential portion of the bearing surface 136, and a second opening 142 may be provided in a center circumferential portion of the bearing surface 136. In particular, the first opening 141 and the second opening 142 may be located at two different angular positions with respect to the axis A, wherein the two angular positions may enclose an angle of 5° or more, particularly an angle of 10° or more, more particularly an angle of 15° or more therebetween. Alternatively or additionally, a first distance D1 between the first opening 141 and the second opening 142 may be 2 cm or more, particularly 3 cm or more, more particularly 4 cm or more.

In some embodiments, the at least one tilting pad 131 may extend over an angular range ("pad angle") of n degrees in the circumferential direction, wherein n may be from 40° to 80°, particularly from 50° to 70°. The first opening 141 and the second opening 142 may be arranged at two different angular positions which enclose an angle from n/8 to n/2 therebetween.

By feeding the lubricant to the bearing surface 136 at different angular positions, a more uniform distribution of lubricant from the leading edge of the tilting edge to the trailing edge of the tilting pad can be provided.

In some embodiments, which may be combined with other embodiments described herein, the bearing surface 136 of the at least one tilting pad 131 may be provided with four or more, particularly six or more, more particularly ten or more lubricant feed openings. Only two lubricant feed openings (first opening 141 and second opening 142) are shown in the sectional view of FIG. 2. However, further lubricant feed openings may be provided at a distance from the first opening 141 and/or from the second opening 142 in the axial direction.

At least one opening (e.g., the first opening 141) may be provided in the leading circumferential portion of the at least one tilting pad 131. For example, a distance between the first opening 141 and a leading edge 145 of the tilting pad may be 5 cm or less, particularly 2 cm or less. The leading edge 145 of the tilting pad may be understood as the edge of the bearing surface that is passed first by a given point of the rotating shaft during operation of the bearing. The trailing edge 146 of the tilting pad may be understood as the edge of the bearing surface that is passed last by the given point of the rotating shaft during operation of the bearing. Accordingly, during operation of the bearing, a given point of the rotating shaft first slides past the leading circumferential portion of the bearing surface, then slides past the center circumferential portion of the bearing surface and finally slides past the trailing circumferential portion of the bearing surface.

In some embodiments, the center circumferential portion of the bearing surface may be defined as the middle third of the angular range of the bearing surface, whereas the leading and trailing circumferential portions may be defined as the two outer thirds of the angular range of the bearing surface.

At least one opening (e.g., the second opening 142 in FIG. 2) may be provided in the center circumferential portion of the at least one tilting pad 131. For example, a distance between the second opening 142 and the angular center of the tilting pad may be 5 cm or less, particularly 2 cm or less. In some embodiments, the second opening 142 may be provided exactly in the angular center of the at least one tilting pad 131. In this case, the second opening 142 may be fed with lubricant from a channel which may extend in a radial direction from the bearing housing 120 through the flexible web support 135.

In some embodiments, which may be combined with other embodiments described herein, a ratio between the total area of the bearing surface 136 covered by openings and the total area of the remaining area of the bearing surface 136 where no openings are provided may be from 1% to 5%. A higher value than 5% may not be advantageous in some embodiments, as the formation of the hydrodynamic wedge may be negatively affected. For example, in some embodiments, none of the individual openings may cover an area of more than 2% or more than 1% of the total bearing surface.

As is schematically depicted in FIG. 2, a channel system 150 for supplying the lubricant from the bearing housing 120 toward the plurality of lubricant feed openings 140 may extend through the interior of the at least one tilting pad 131. At least one main channel 152 of the channel system 150 may extend from the bearing housing 120 through the flexible web support 135 toward the at least one tilting pad 131, e.g. essentially in a radial direction R. The at least one main channel 152 may be adapted to guide a lubricant from a lubricant reservoir in the bearing housing through the flexible web support 135 toward the plurality of lubricant feed openings 140. In the case of a thrust bearing, the main channel of the channel system may essentially extend in an axial direction.

In some embodiments, two, three or more main channels 152 may extend through the flexible web support 135, e.g. in the radial direction R, wherein the two, three or more main channels may be axially spaced apart from each other.

A cross section of the at least one main channel 152 may not be circular in some embodiments. For example, the cross-section of the at least one main channel 152 may be essentially rectangular at least in a section extending through the flexible web support 135. A non-circular cross sectional shape of the main channel may be advantageous, as the flexible web support may have a small circumferential width and a larger axial width, so that the channel shape may be adapted to the shape of the flexible web support.

In some embodiments, one or more transversal channels 151 of the channel system 150 may extend in a non-radial direction through the at least one tilting pad 131. For example, one or more transversal channels 151 may extend from the main channel 152 of the channel system 150 into a leading portion and/or into a trailing portion of a body of the tilting pad.

At least one transversal channel 151 of the channel system 150 may extend at an angle of 45° or more with respect to the radial direction R and/or axial direction, more particularly at an angle of 60° or more with respect to the radial direction R and/or axial direction, more particularly essentially perpendicular with respect to the radial direction and/or the axial direction, e.g. as a tangent to the circumferential direction U. In some embodiments, the at least one transversal channel 151 may extend essentially in the circumferential direction U. The at least one transversal channel 151 may be a curved channel or a linear channel. In the embodiment shown in FIG. 2, the transversal channel 151 linearly extends from the main channel 152 into a leading portion of the body of the tilting pad and may have a length of 4 cm or more. In the case of a thrust bearing, at least one transversal channel may extend at an angle with respect to the axial direction, e.g. at an angle of 60° or more or essentially perpendicular.

The at least one transversal channel 151 may be configured for guiding the lubricant through the interior of the tilting pad toward the first opening 141 that is arranged in the leading circumferential portion of the bearing surface 136. In some embodiments, two or more openings are provided in a leading circumferential portion of the bearing surface 136, wherein each of said openings may have an associated transversal channel 151 for guiding the lubricant toward the respective opening. In some embodiments, at least one opening (not shown in the figures) may be provided in a trailing circumferential portion of the bearing surface, wherein a transversal channel may be provided for guiding the lubricant toward said at least one opening.

Each opening of the plurality of lubricant feed openings 140 may be in fluid communication with an associated supply channel 153 of the channel system 150 for guiding a lubricant to the opening. The supply channels 153 may extend essentially perpendicular to the bearing surface, e.g. in a radial direction, and may connect the openings with a main channel 152 of the channel system and/or with a transversal channel 151 of the channel system. For example, the supply channels 153 may be arranged downstream from the main channels 152 and from the transversal channels 151, and directly upstream from the lubricant-feed openings. A cross-sectional shape and/or a cross-sectional area of the openings may essentially correspond to a cross-sectional shape and/or a cross-sectional area of the associated supply channel, respectively. In some embodiments, a cross-sectional area and/or a cross-sectional shape of the main channel 152 may be different from the cross-sectional area and/or the cross-sectional shape of the supply channels 153.

Figure 3:
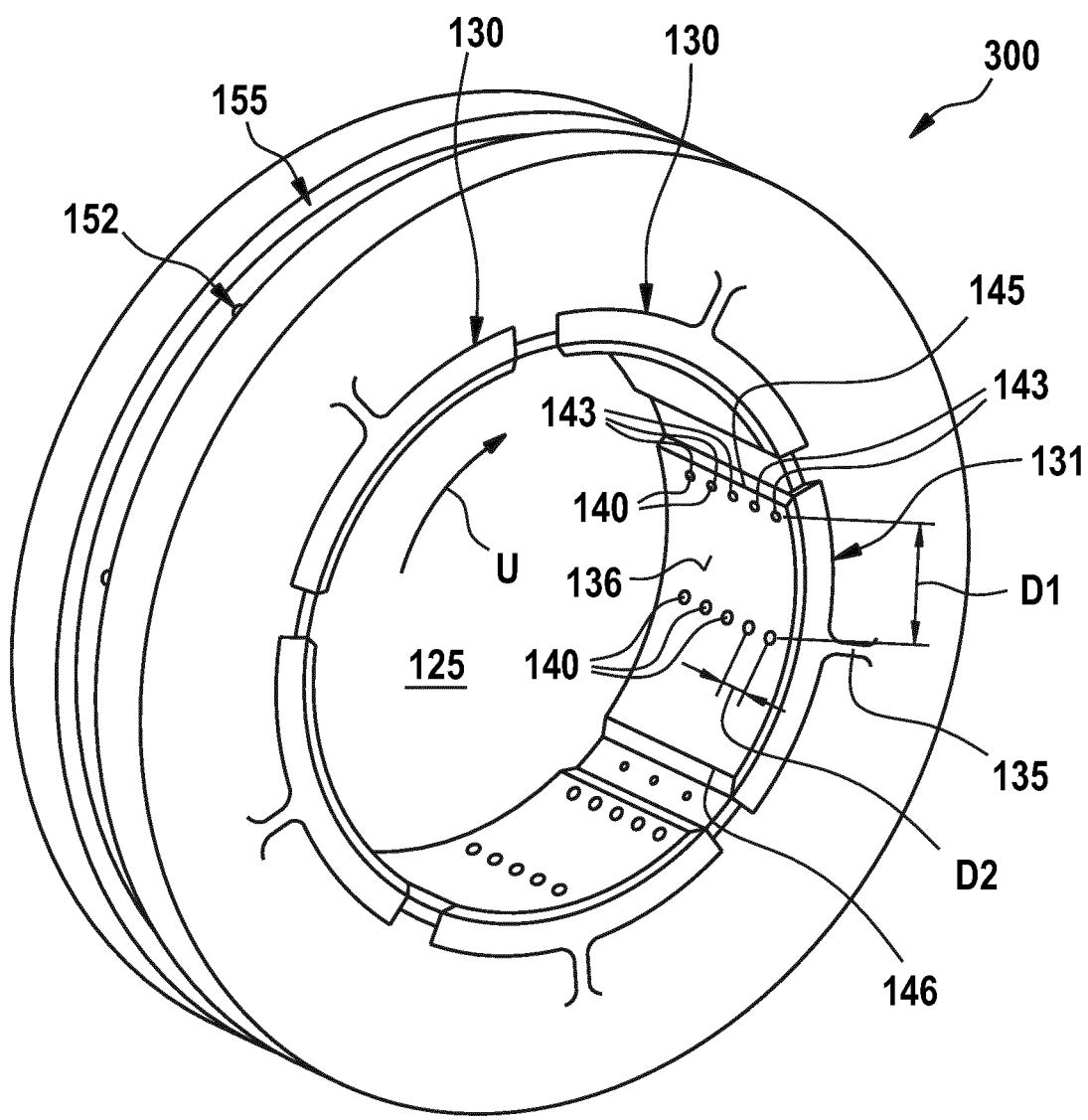
FIG. 3 is a perspective view of a bearing according to embodiments described herein.

FIG. 3 is a perspective view of a bearing 300 according to embodiments described herein. Most of the features of the bearing 300 correspond to the features of the bearing 100 shown in FIG. 1 so that reference can be made to the above explanations which are not repeated here.

The bearing 300 is a monolithic or "one-piece" bearing, including a plurality of tilting pads 130 (here: five tilting pads) which are integrally formed with a respective tiltable web support 135 and with the bearing housing 120.

A plurality of lubricant feed openings 140 is provided in the bearing surfaces 136 of each tilting pad of the plurality of tilting pads 130. In the following, only the tilting pad 131 will be described in more detail, but the remaining tilting pads may be correspondingly shaped and may exhibit corresponding features.

The tilting pad 131 includes a bearing surface 136 having a plurality of lubricant feed openings 140 provided therein, particularly six or more and/or twenty or less openings, more particularly ten openings.

In some embodiments, which may be combined with other embodiments described herein, two or more axially-spaced openings 143 of the plurality of lubricant feed openings 140 may be spaced apart in an axial direction of the bearing surface 136. For example, two, three, four, five or more axially-spaced openings 143 may be arranged in a row extending in the axial direction, e.g. at regular intervals between two adjacent openings. For example, a second distance D2 between two adjacent axially-spaced openings 143 in the axial direction may be 2 mm or more and 50 mm or less, particularly 5 mm or more and 20 mm or less.

In some embodiments, the tilting pad may have an axial extension of n centimeter, wherein the distance between two axially-spaced openings may be more than n/2 centimeter.

In some embodiments, two or more rows of axially-spaced openings 143 may be provided in the bearing surface 136 of the tilting pad 131. The rows may be provided at different angular positions in the circumferential direction U. For example, a first row of axially-spaced openings 143 may be provided in the leading portion of the bearing surface, and a second row of axially-spaced openings may be provided in the center portion of the bearing surface 136. In some embodiments, more than two rows of axially-spaced openings may be provided in the bearing surface 136, e.g. three, four or more rows.

In some embodiments, which may be combined with other embodiments described herein, two, three or more openings of the plurality of lubricant feed openings 140 may be provided in the leading circumferential portion of the bearing surface, two, three or more openings of the plurality of lubricant feed openings 140 may be provided in the center circumferential portion of the bearing surface, and/or two, three or more openings of the plurality of lubricant-feed openings may be provided in the trailing circumferential portion of the bearing surface. A uniform distribution of lubricant across the bearing surfaces can be obtained, when at least two openings are provided in the leading circumferential portion and at least two openings are provided in the center circumferential portion, whereas no opening may be necessary in the trailing circumferential portion, as is schematically indicated in FIG. 3.

A channel system may extend through each of the plurality of tilting pads 130 for supplying the respective pluralities of lubricant feed openings with the lubricant. The channel systems may have some or all of the features of the channel system 150 shown in more detail in FIG. 2. The bearing housing 120 may include an annular fluid reservoir 155 for supplying the channel systems with the lubricant. The main channels 152 of the respective channel systems may extend radially inward from the annular fluid reservoir 155 at angular positions which correspond to the angular positions where the flexible web supports are arranged.

In some embodiments, the bearing may include a pressure control unit configured to adjust a lubricant pressure in the channel system in a range between 1.1 bar and 5 bar absolute, particularly in a range between 1.1 bar and 3 bar absolute.

Figure 4A:
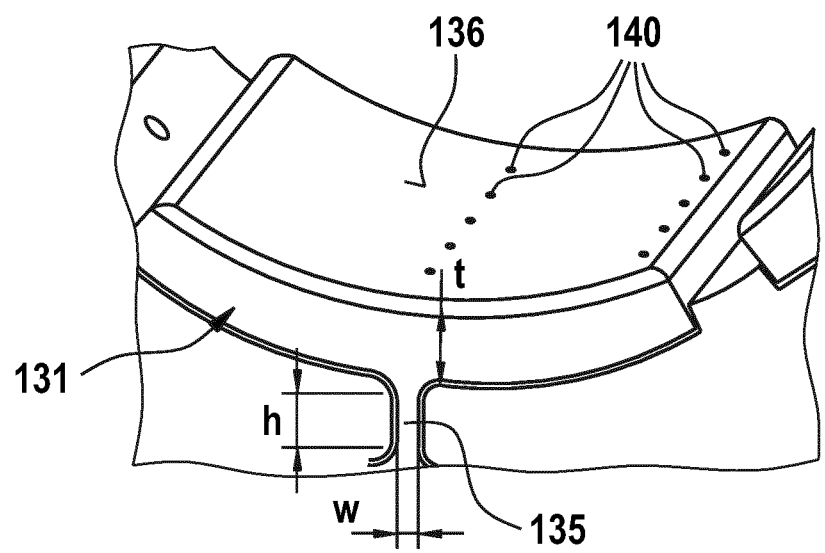
FIG. 4A is an enlarged perspective view of one of the tilting pads of the bearing of FIG. 3.

FIG. 4A is an enlarged perspective view of one of the tilting pads of the bearing of FIG. 3. As is shown in detail, a first row of openings is arranged in the angular center of the tilting pad 131, and a second row of openings is arranged adjacent to the leading edge of the tilting pad. Accordingly, the leading circumferential portion of the bearing surface which is passed first by a given point of the shaft can be sufficiently supplied with lubricant. The lubricant may be carried in the circumferential direction toward the center of the tilting pad, where further lubricant may be supplied by the central row of openings. The lubricant may be carried further in the circumferential direction toward the trailing edge of the tilting pad. No further supply of lubricant in the trailing circumferential portion of the tilting pad may be needed.

In some embodiments, which may be combined with other embodiments described herein, a minimum width w of the flexible web support 135 may be from 1 mm to 4 mm, particularly from 1.8 mm to 3.2 mm, in the case of a bearing configured for supporting a shaft with a diameter of 110 mm. In some embodiments, a height h of the flexible web support may be from 2 mm to 10 mm, particularly from 3 mm to 7 mm, in the case of a bearing configured for supporting a shaft with a diameter of 110 mm.

In some embodiments, a radial thickness t of the tilting pad may be from 6 mm to 14 mm, particularly from 8 mm to 12 mm, in the case of a bearing configured for supporting a shaft with a diameter of 110 mm. The tilting pads of bearings configured for other shaft diameters may be differently shaped.

Figure 4B:
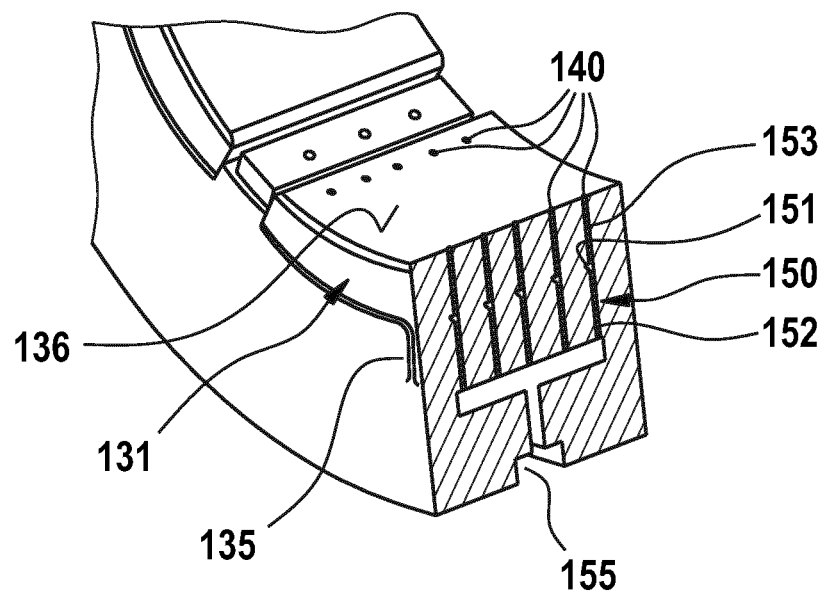
FIG. 4B is an enlarged view showing an axial section of one of the tilting pads of the bearing of FIG. 3.

FIG. 4B is an axial sectional view of one of the tilting pads of the bearing of FIG. 3. As is schematically depicted in FIG. 4B, each opening of the plurality of lubricant feed openings 140 is in fluid connection with a radially extending supply channel 153 arranged upstream thereof. One or more main channels 152 may be arranged upstream from the supply channels 153, wherein the main channels may extend radially through the flexible web support 135. Transversal channels 151 may branch off from the main channels 152 in order to guide the lubricant toward the openings which are arranged in a leading circumferential portion of the bearing surface.

Figure 4C:
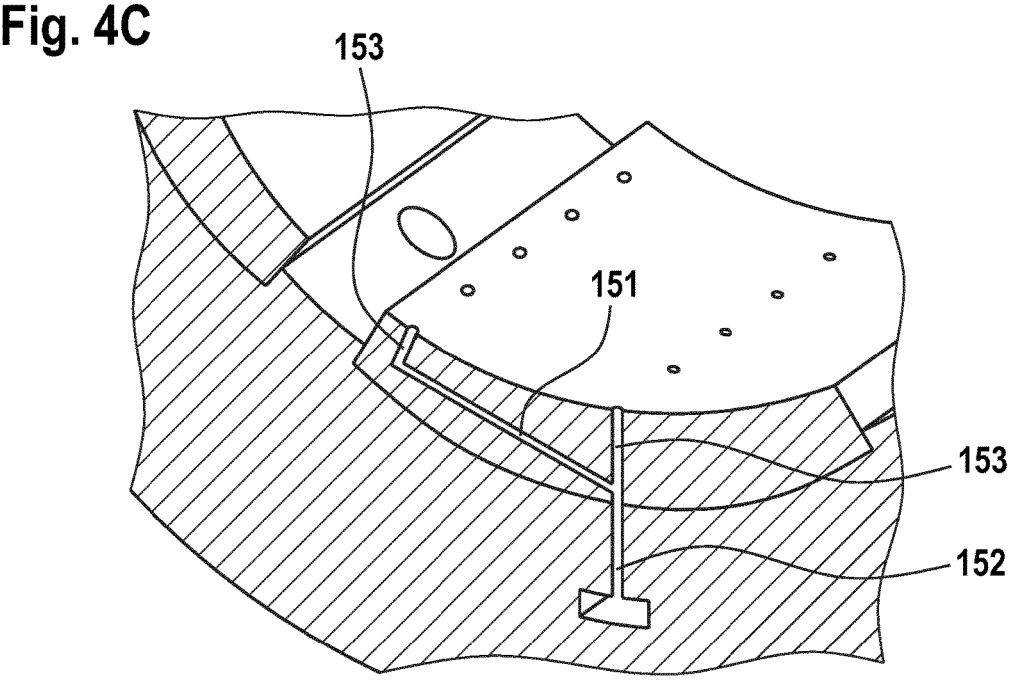
FIG. 4C is an enlarged sectional view of one of the tilting pads of the bearing of FIG. 3.

FIG. 4C is an enlarged sectional view of one of the tilting pads of the bearing of FIG. 3. The sectional plane extends through one of the transversal channels 151 which branches off from the main channel 152 inside the body of the tilting pad 131. A radial supply channel 153 extends from the downstream end of the transversal channel 151 toward one of the openings which are provided in the leading circumferential portion.

According to a further aspect of the present disclosure, a rotary mechanical device is provided. The rotary mechanical device may include a bearing according to any of the embodiments described herein. Further, the rotary mechanical device includes a shaft 200 that is rotatably supported in the shaft receiving space 125 of the bearing.

The bearing may be a radial bearing or a thrust bearing. Further, the bearing may be a hydrodynamic bearing or a hydrostatic bearing.

In some embodiments, the rotary mechanical device is a high-speed rotary mechanical device. For example, the rotary mechanical device may be at least one of a compressor and a turbine, more particularly a steam turbine or a gas turbine. In some embodiments, the rotary mechanical device is at least one of a high-speed compressor, a steam turbine, a gas turbine, and a device for high-speed balancing of machines.

The rotary mechanical device may be configured to rotate the shaft at a peripheral speed of 80 m/s or more, particularly 100 m/s or more, more particularly 120 m/s or more.

According to a further aspect described herein, a method of operating a bearing is provided. The bearing may have some features or all of the features of any of the embodiments described herein so that reference can be made to the above explanations which are not repeated here. A shaft 200 is rotatably mounted in the shaft receiving space 125 of the bearing.

The shaft is rotated, while a lubricant is supplied through the plurality of lubricant feed openings 140 of the bearing such as to provide a hydrodynamic lubrication wedge between the bearing surface and a shaft surface. In some embodiments, the lubricant may be supplied to the plurality of openings through a channel system 150 provided in the interior of the at least one tilting pad 131 at a pressure of 5 bar or less absolute, particularly at a pressure between 1.1 bar and 3 bar absolute.

In some embodiments, the shaft 200 may be rotated at a peripheral speed of 80 m/s or more, particularly 100 m/s or more, more particularly 120 m/s or more.

Figure 5A:
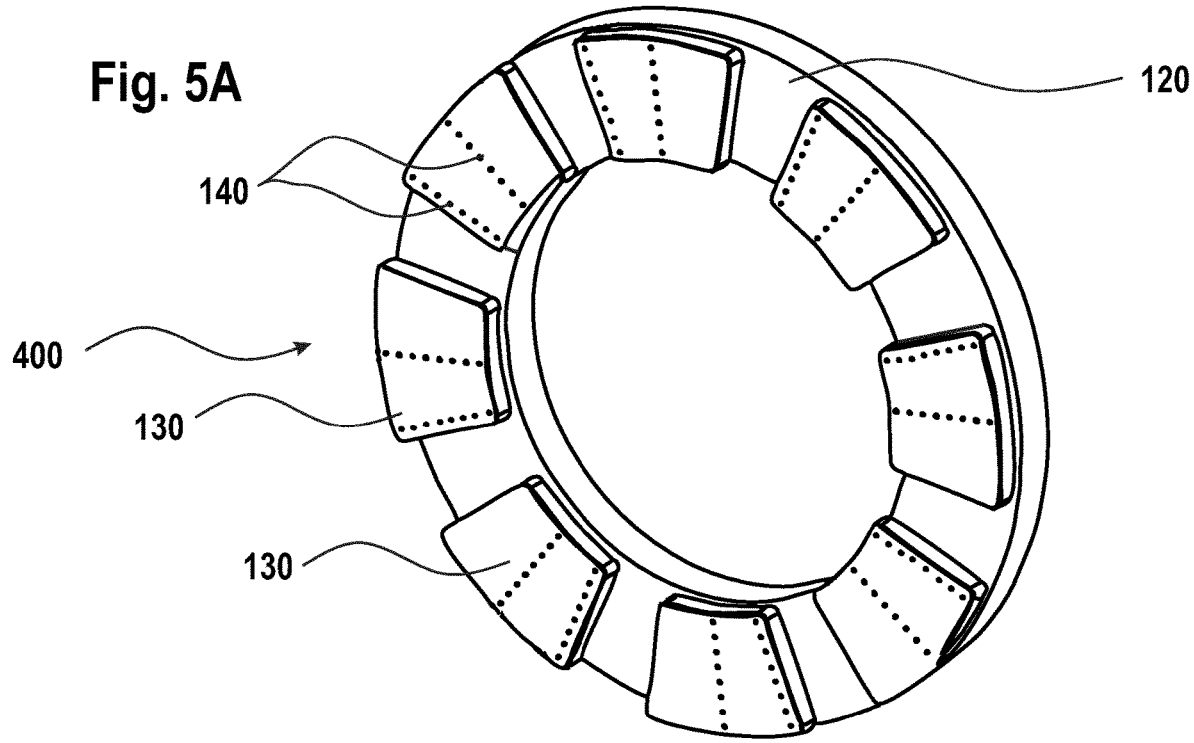
FIG. 5A is a schematic perspective view of a bearing according to embodiments described herein which is configured as a thrust bearing or an axial bearing.

FIG. 5A is a perspective view of a bearing according to embodiments described herein which is configured as a thrust bearing 400. In the case of a thrust bearing, the plurality of tilting pads 130 may be connected to a front surface of the bearing housing 120 which may have an annular shape in some embodiments.

Figure 5B:
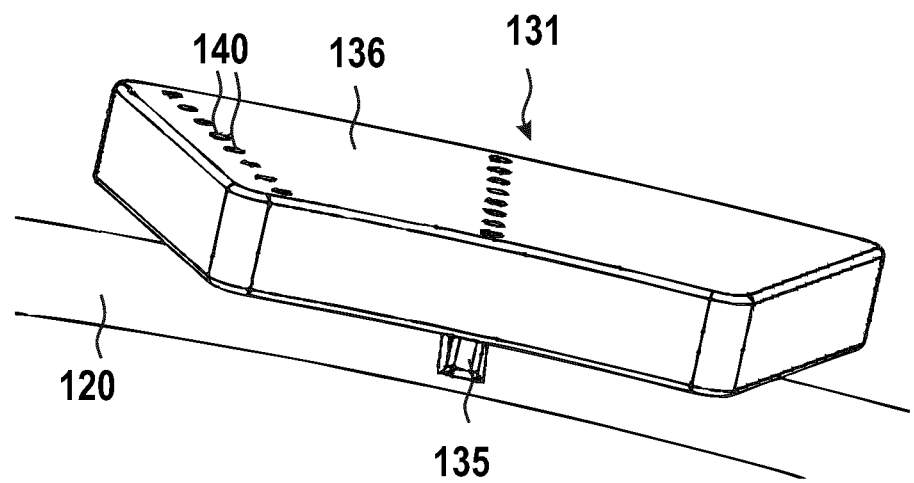
FIG. 5B is an enlarged view of a single tilting pad of the thrust bearing of FIG. 5A.

FIG. 5B is an enlarged view of one of the tilting pads of the thrust bearing of FIG. 5A.

The plurality of tilting pads 130 may be arranged such that the bearing surfaces of the tilting pads are essentially flat and extend essentially perpendicular with respect to the axis A of the shaft. A radial surface of the rotating shaft, e.g. an end surface or a radial step of the shaft can be supported on the bearing surfaces of the plurality of tilting pads. More than five tilting pads may be provided in some embodiments.

The bearing may be a hydrodynamic bearing configured to provide a hydrodynamic lubrication wedge between the shaft and the bearing surfaces of the tilting pads. In some embodiments, the bearing is a monolithic bearing.

The bearing surface of at least one tilting pad 131 of the plurality of tilting pads includes a plurality of lubricant feed openings 140. A channel system may be provided in the interior of the at least one tilting pad 131 for guiding the lubricant through the flexible web support 135 of the at least one tilting pad 131 toward the plurality of lubricant feed openings 140.

Analogously to the above described radial bearings, at least two openings of the plurality of lubricant feed openings 140 may be spaced apart in the circumferential direction. Alternatively or additionally, rows of openings may be provided which extend essentially in the radial directions, wherein the rows may be spaced apart in the circumferential direction. Details of the channel system which extends through the at least one tilting pad may correspond to the above described details and are not repeated here. As will be apparent to the skilled person, in the case of a thrust bearing, the flexible web support 135 allows a tilting movements of the tilting pads with respect to a radial tilting axis and/or with respect to a tilting axis extending perpendicular to the radial tilting axis, as can be seen in more detail from FIG. 5B.

Figure 6:
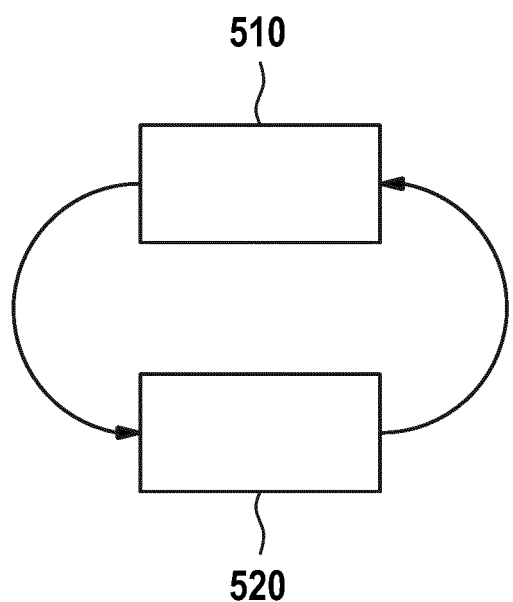
FIG. 6 is a flow diagram illustrating a method of manufacturing a bearing according to embodiments described herein.

FIG. 6 is a flow diagram illustrating a method of manufacturing a bearing for supporting a shaft 200 rotating around an axis. According to embodiments described herein. The bearing may include some or all of the features of any of the bearings described herein, so that reference can be made to the above explanations, which are not repeated here. In particular, the bearing may include a plurality of tilting pads 130, wherein each tilting pad is connected to a bearing housing 120 via a flexible web support 135 and comprises a bearing surface 136. In some embodiments, the bearing may be a monolithic bearing.

As is illustrated by boxes 510 and 520, at least one tilting pad 131 of the plurality of tilting pads 130 is manufactured with a plurality of lubricant feed openings 140 in the bearing surface 136 by additive manufacturing.

Additive manufacturing describes a processing technique for building up a piece in layers by depositing material. Instead of milling the piece from a material block, the piece may be built up layer-by layer using a material which may be applied in a powder form.

In box 510, a layer of material may be applied to a platform. In box 520, the layer of material may be fused, e.g. by a laser, in accordance with design data which includes 3D-information of the device to be built, and the platform is shifted, e.g. lowered. The method returns to box 510, wherein a further layer of material is applied on top of the fused first layer. In box 520, the second layer may be fused in accordance with the design data. Fusing the second layer may include bonding the second layer to the first layer at predetermined points. The platform is shifted again, and a third layer of material is applied on top of the fused second layer. The process proceeds, until the device is built in accordance with the design data.

The additive manufacturing may include selective laser melting or laser sintering.

In some embodiments, each tilting pad of the plurality of tilting pads 130 is integrally formed with the bearing housing 120 by additive manufacturing, particularly by selective laser melting or laser sintering.

Further, a channel system for guiding a lubricant toward the plurality of openings provided in the bearing surface may be formed by additive manufacturing, particularly by selective laser melting or laser sintering. A channel system may be manufactured entirely inside each tilting pad of the plurality of tilting pads.

While the foregoing is directed to embodiments of the disclosure, other and further embodiments of the disclosure may be devised without departing from the basic scope thereof, and the scope thereof is determined by the claims that follow.

The invention claimed is:

1. A bearing for supporting a shaft rotating around an axis, comprising:
a bearing housing; and
a plurality of tilting pads, wherein each tilting pad is connected to the bearing housing via a flexible web support and comprises a bearing surface directed toward a shaft receiving space,
wherein the bearing surface of at least one tilting pad of the plurality of tilting pads comprises a plurality of lubricant feed openings; the plurality of tilting pads are integrally formed with the respective flexible web supports and with the bearing housing; the plurality of lubricant feed openings are in fluid communication with a channel system extending through the interior of the at least one tilting pad and through the flexible web support of the at least one tilting pad; and one or more transversal channels of the channel system extend at least partially in a non-radial direction through the at least one tilting pad.

2. The bearing of claim 1, wherein the bearing is configured as a radial bearing and wherein the bearing housing surrounds the shaft receiving space in a circumferential direction.

3. The bearing of claim 1, wherein (i) two or more openings of the plurality of lubricant feed openings are spaced apart in a circumferential direction and/or (ii) two or more openings of the plurality of lubricant feed openings are spaced apart in an axial direction.

4. The bearing of claim 1, wherein the bearing surface of the at least one tilting pad is provided with four or more lubricant feed openings.

5. The bearing of claim 1, wherein two or more openings of the plurality of lubricant feed openings are provided in a leading circumferential portion of the bearing surface and/or are provided in a center circumferential portion of the bearing surface.

6. The bearing of claim 1, wherein the channel system extends through each of the plurality of tilting pads, and the bearing housing comprises an annular fluid reservoir fluidly connected to the channel system and configured to supply the channel system with a lubricant.

7. A rotary mechanical device comprising:
   at least one bearing according to claim 1; and
   the shaft rotatably supported in the shaft receiving space of the bearing,
   wherein the rotary mechanical device is a high-speed rotary mechanical device.

8. The rotary mechanical device of claim 7, wherein the rotary mechanical device is a compressor, a turbine, a steam turbine or a gas turbine.

9. A method of operating the bearing of claim 1, comprising:
   supporting the shaft in the shaft receiving space of the bearing; and
   rotating the shaft while supplying a lubricant through the plurality of lubricant feed openings to provide a hydrodynamic lubrication wedge between the bearing surface and a shaft surface.

10. The method of claim 9, wherein the shaft is rotated at a peripheral speed of 80 m/s or more.

11. The bearing of claim 1, wherein the at least one tilting pad of the plurality of tilting pads is manufactured with the plurality of lubricant feed openings in the bearing surface by additive manufacturing.

12. The bearing of claim 11, wherein the plurality of tilting pads are integrally formed with the bearing housing by additive manufacturing, and wherein the channel system is formed in each of the plurality of tilting pads.

13. The bearing of claim 1, wherein the one or more transversal channels of the channel system extend at an angle of 45° or more with respect to a radial direction.

14. The bearing of claim 13, wherein the one or more transversal channels of the channel system extend essentially perpendicularly with respect to the radial direction and/or an axial direction.

15. The bearing of claim 1, wherein the at least one tilting pad of the plurality of tilting pads is manufactured with the plurality of lubricant feed openings in the bearing surface by selective laser melting or laser sintering.

\* \* \* \* \*